(12) United States Patent
Wolfensparger et al.

(10) Patent No.: US 11,527,043 B2
(45) Date of Patent: Dec. 13, 2022

(54) PROVIDING SELECTABLE VIRTUAL REALITY (VR) VIEWPOINTS WITHIN A VR EXPERIENCE

(71) Applicant: Charter Communications Operating, LLC, St. Louis, MO (US)

(72) Inventors: Dell Wolfensparger, Langley, WA (US); Dhananjay Lal, Englewood, CO (US); Matthew Ringenberg, Denver, CO (US); Andrew Ip, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 90 days.

(21) Appl. No.: 16/786,621

(22) Filed: Feb. 10, 2020

(65) Prior Publication Data
US 2021/0248821 A1    Aug. 12, 2021

(51) Int. Cl.
*G06T 19/00* (2011.01)
*G06F 3/01* (2006.01)
*G06F 3/04815* (2022.01)

(52) U.S. Cl.
CPC ........... *G06T 19/003* (2013.01); *G06F 3/011* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 2017/0128842 A1* | 5/2017 | Harris | A63F 13/822 |
| 2018/0061002 A1* | 3/2018 | Lee | H04N 19/88 |
| 2018/0093186 A1* | 4/2018 | Black | G06T 11/60 |
| 2019/0246146 A1* | 8/2019 | Bustamante | H04N 21/2396 |
| 2019/0306530 A1* | 10/2019 | Fan | H04N 21/2362 |
| 2020/0118342 A1* | 4/2020 | Varshney | H04S 7/304 |

* cited by examiner

*Primary Examiner* — Peter Hoang
(74) *Attorney, Agent, or Firm* — Dority & Manning, P.A.

(57) ABSTRACT

Providing selectable virtual reality (VR) viewpoints within a VR environment is disclosed. In one embodiment, a network computing device provides downloadable VR content that defines a VR environment comprising a plurality of viewpoints. The plurality of viewpoints may include, as non-limiting examples, one or more viewpoints corresponding to one or more VR participants within the VR environment, and/or one or more predefined non-participant viewpoints. The network computing device receives a viewpoint selection indication from a client computing device of a spectator of the VR environment, wherein the viewpoint selection indication corresponds to a selected viewpoint of the plurality of viewpoints. The network computing device then transmits, to the client computing device, a pose data stream comprising pose data corresponding to the selected viewpoint. The client computing device may then display the VR environment based on the VR content and the pose data corresponding to the selected viewpoint.

19 Claims, 9 Drawing Sheets

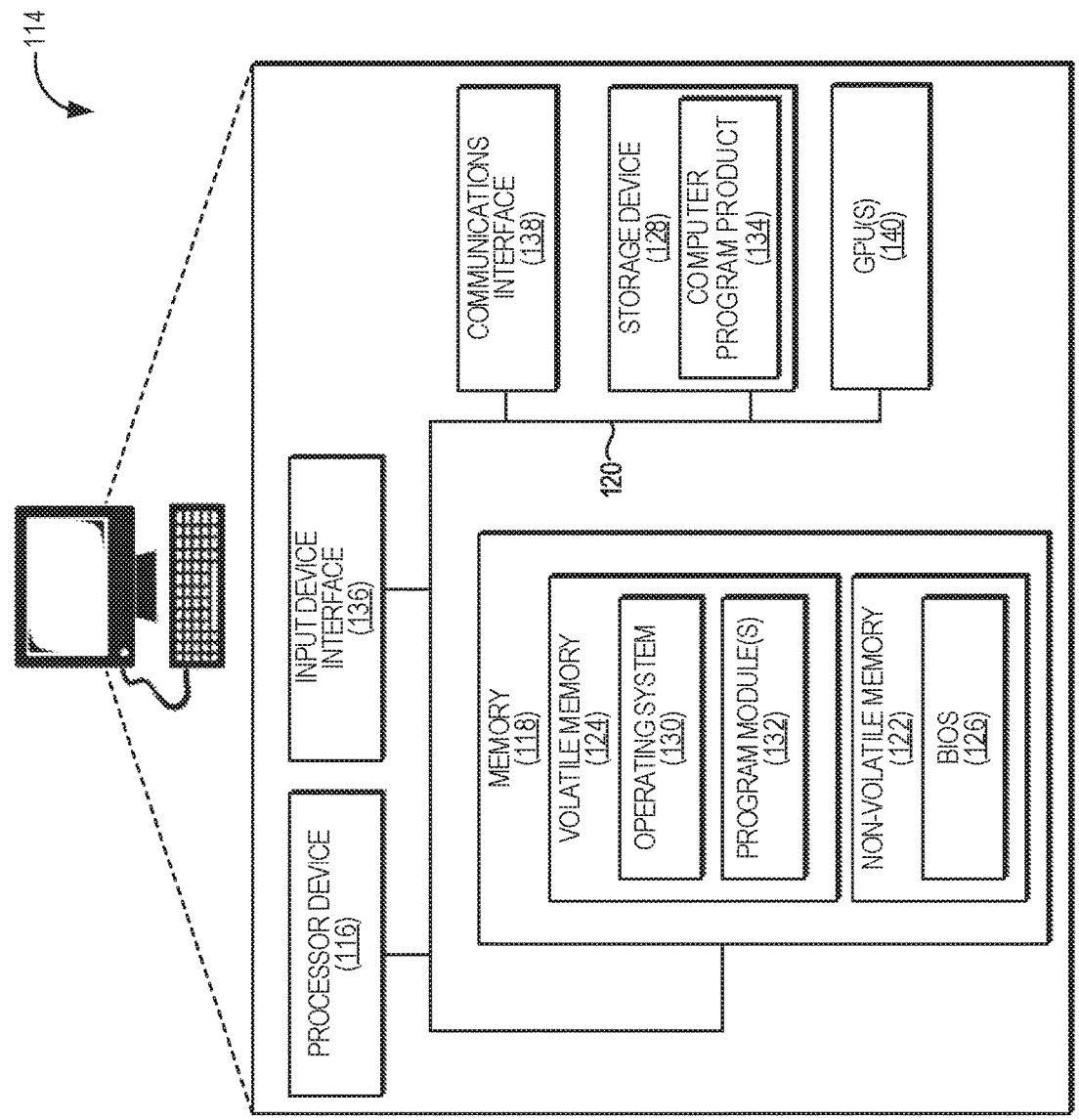

PROVIDING SELECTABLE VIRTUAL REALITY (VR) VIEWPOINTS WITHIN A VR EXPERIENCE

BACKGROUND

A virtual reality (VR) environment enables a user to experience an immersive virtual world using a VR head-mounted display device (HMDD) that renders high-resolution VR content. The VR environment may be generated by a network computing device and streamed to a user's HMDD, or may be generated by a client computing device of the user based on downloaded VR content. While multiple VR participants may be active within the VR environment at a given time, conventional techniques for allowing a spectator (i.e., a user who is not a VR participant within the VR environment) to view the VR environment may be limited to a viewpoint of a single VR participant, and further may rely on bandwidth-intensive streaming of the VR environment to the spectator.

SUMMARY

The embodiments disclosed herein provide selectable virtual reality (VR) viewpoints within a VR experience to allow a spectator to select from among multiple VR viewpoints (e.g., VR participant viewpoints and/or predefined non-participant viewpoints, as non-limiting examples), and to generate a VR environment locally using a low-bandwidth pose data stream for the selected viewpoint.

In one embodiment, a method for providing selectable VR viewpoints within a VR environment is provided. The method includes providing, by a network computing device, downloadable VR content defining a VR environment comprising a plurality of viewpoints. The method further includes receiving, by the network computing device, a viewpoint selection indication from a client computing device, the viewpoint selection indication corresponding to a selected viewpoint of the plurality of viewpoints. The method also includes transmitting, to the client computing device, a pose data stream comprising pose data corresponding to the selected viewpoint.

In another embodiment, a computer system for providing selectable VR viewpoints within a VR environment is provided. The computer system includes a network computing device that comprises a first memory and a first processor device coupled to the first memory. The first processor device is configured to provide downloadable VR content defining a VR environment comprising a plurality of viewpoints. The first processor device is further configured to receive a viewpoint selection indication from a client computing device, the viewpoint selection indication corresponding to a selected viewpoint of the plurality of viewpoints. The first processor device is also configured to transmit, to the client computing device, a pose data stream comprising pose data corresponding to the selected viewpoint.

In another embodiment, a computer program product is provided. The computer program product is stored on a non-transitory computer-readable storage medium and includes computer-executable instructions configured to cause a processor device to provide downloadable VR content defining a VR environment comprising a plurality of viewpoints. The computer-executable instructions are further configured to cause the processor device to receive a viewpoint selection indication from a client computing device, the viewpoint selection indication corresponding to a selected viewpoint of the plurality of viewpoints. The computer-executable instructions are also configured to cause the processor device to transmit, to the client computing device, a pose data stream comprising pose data corresponding to the selected viewpoint.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 7 is a block diagram of a computing device suitable for implementing embodiments disclosed herein.

DETAILED DESCRIPTION

Figure 1:
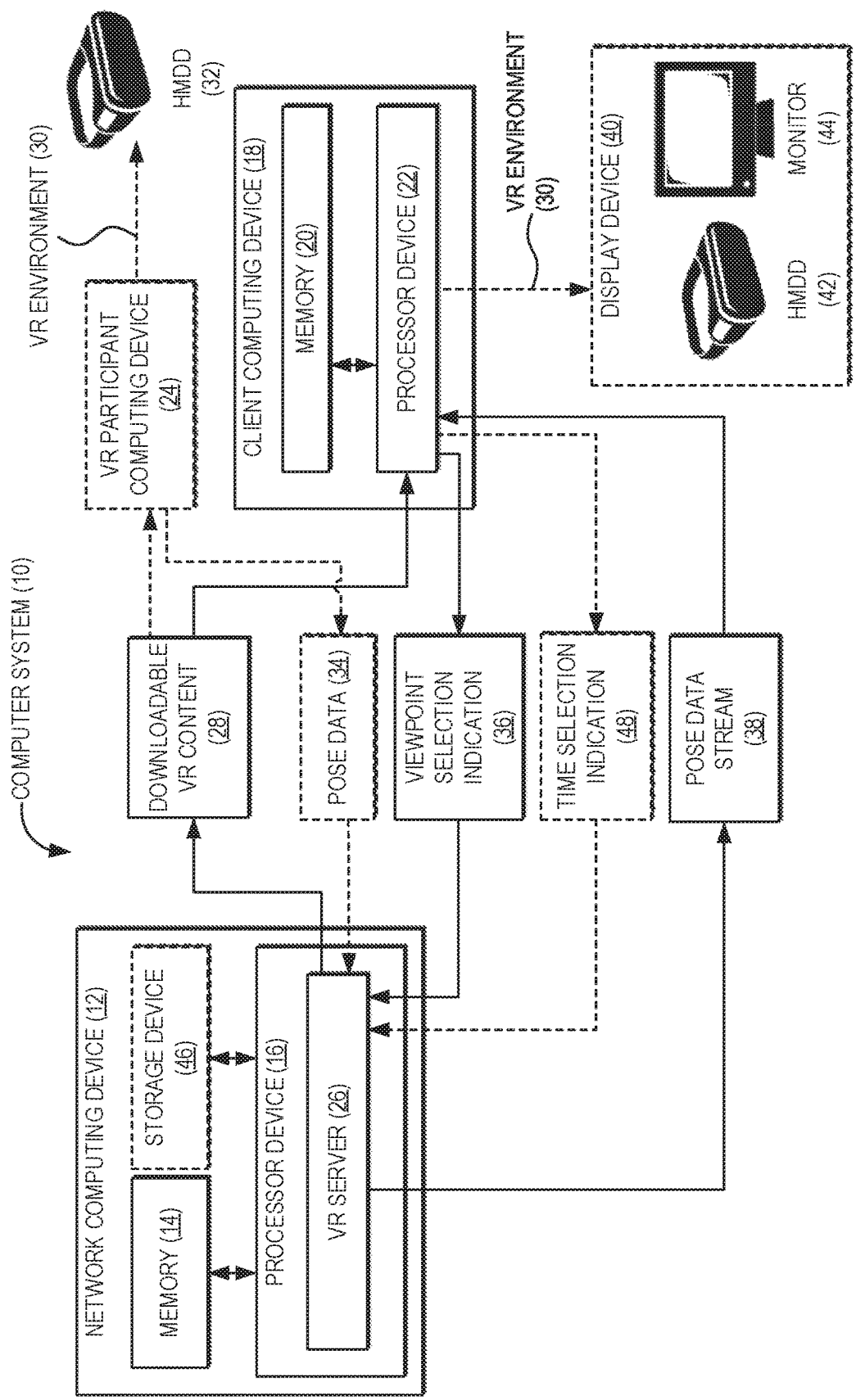
FIG. 1 is a block diagram illustrating an exemplary computer system, including a network computing device and a client computing device, configured to provide selectable virtual reality (VR) viewpoints in a VR environment, according to some embodiments.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply an order, a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtual reality (VR) generally refers to an immersive virtual experience created for a user by generating a VR environment defined by VR content provided by a network computing device and rendered using, e.g., a VR head-mounted display device (HMDD) communicatively coupled to a client computing device. The HMDD displays a field of view (FOV) that defines a horizontal and vertical extent of what the user in the VR environment can visually perceive at an instant in time. As the user moves about the VR environment, the HMDD continuously provides orientation and movement data (collectively referred to herein as "pose data") to the network computing device. As the user moves her head, the scene encompassed by the FOV of the HMDD changes, similar or identical to the manner in which the scene within the FOV of human eyes changes as a human moves her head about the real world.

In some embodiments, imagery representing the VR environment may be generated by the network computing device based on the VR content. The imagery may then be streamed to the user's client computing device over a network connection and displayed on the user's HMDD. However, this approach may require that the network connection between the network computing device and the user's client computing device provide sufficiently high levels of bandwidth and reliability, and further may require that the network computing device possess substantial processing capacity.

Alternatively, to reduce the bandwidth necessary to provide the VR environment to the user, the user's client computing device may download the VR content from the network computing device, and use the VR content to generate the VR environment locally for display via the HMDD. In such embodiments, the VR content downloaded by the client computing device may include all data necessary to render the VR environment locally by the client computing device and display the VR environment using the HMDD. For example, the VR content may include data that defines static, non-moving elements of the VR environment, and may also include data that deterministically defines movements and behavior of dynamic elements within the VR environment.

In such embodiments, instead of having to generate and transmit each frame of the VR environment for each VR participant within the VR environment, the network computing device need only transmit pose data for the VR participants within the VR environment. Thus, for instance, a client computing device for a first VR participant within the VR environment may transmit pose data for the first VR participant to the network computing device. The network computing device may then transmit the pose data for the first VR participant to other VR participants, and may also transmit pose data received from the other VR participants within the VR environment to the first VR participant. In this manner, the client computing device for each VR participant can accurately render the in-world representations of the other VR participants within the VR environment. The pose data may define the current virtual location of each VR participant within the VR environment, as well as the current orientation (including the direction) of the view of each VR participant in the VR environment.

While multiple VR participants may be active within the VR environment at a given time, conventional techniques for allowing a spectator (i.e., a user who is not a VR participant within the VR environment) to view the VR environment may be limited to the viewpoint of a single VR participant. Moreover, such conventional techniques may rely on bandwidth-intensive streaming of the VR environment to the spectator. As a result, the scalability of such techniques may be limited. The limitations on scalability may be exacerbated in scenarios where thousands or even millions of spectators are simultaneously viewing the VR environment.

In this regard, the embodiments disclosed herein provide a mechanism for providing selectable VR viewpoints within a VR environment. A network computing device provides downloadable VR content that defines a VR environment including a plurality of viewpoints. The plurality of viewpoints may include, as non-limiting examples, one or more viewpoints corresponding to one or more VR participants within the VR environment, and/or one or more predefined non-participant viewpoints. A client computing device of a spectator provides a viewpoint selection indication, corresponding to a selected viewpoint of the plurality of viewpoints, to the network computing device. The network computing device transmits, to the client computing device, a pose data stream that includes pose data corresponding to the selected viewpoint. The client computing device may then display the VR environment (e.g., using an HMDD or a conventional monitor, as non-limiting examples) based on the VR content and the pose data corresponding to the selected viewpoint. A spectator thus may choose to experience the VR environment from the perspective of a VR participant (e.g., a player of a VR game) or from the perspective of a predefined non-participant viewpoint (e.g., an overhead virtual camera view), as non-limiting examples.

In some embodiments, the pose data stream may be a "live" pose data stream that includes current pose data for the selected viewpoint, or may be a "historical" pose data stream that includes prerecorded pose data for the selected viewpoint. In the latter case, the client computing device may also provide a time selection indication to the network computing device to indicate a point in time from which the spectator desires to experience the VR environment.

FIG. 1 is a block diagram illustrating a computer system 10 that may be utilized to provide selectable VR viewpoints within a VR environment. The computer system 10 in the example of FIG. 1 includes a network computing device 12 comprising a memory 14 communicatively coupled to a processor device 16, and also includes a client computing device 18 comprising a memory 20 communicatively coupled to a processor device 22. In some embodiments, the computer system 10 also includes a VR participant computing device 24, which is configured in a manner similar to the client computing device 18.

It is to be understood that the network computing device 12, the client computing device 18, the VR participant computing device 24, and the constituent elements thereof as illustrated in FIG. 1, may encompass any known digital logic elements, semiconductor circuits, processing cores, and/or memory structures, among other elements, or combinations thereof.

Embodiments described herein are not restricted to any particular arrangement of elements, and the disclosed techniques may be easily extended to various structures and layouts on semiconductor sockets or packages. It is to be understood that some embodiments of the network computing device 12, the client computing device 18, and/or the VR participant computing device 24 may include elements in addition to those illustrated in FIG. 1 (such as, e.g., Level 2 (L2) caches, Level 3 (L3) caches, and/or additional cache controllers or memory controllers), and/or may omit some elements illustrated in FIG. 1.

The processor device 16 of the network computing device 12 includes a VR server 26 that provides downloadable VR content 28 for download by the client computing device 18 and, in some embodiments, the VR participant computing device 24. The downloadable VR content 28 defines a VR environment 30 that is rendered and displayed to a user (i.e., a VR participant) of the VR participant computing device 24 via a VR head-mounted display device (HMDD) 32. The HMDD 32 in some embodiments is configured to be coupled to a head of the VR participant, such as via a frame similar to glasses, or via straps, a helmet, a cap, or the like. As noted above, the downloadable VR content 28 may include all data necessary to render the VR environment 30, such as, e.g., data that defines static, non-moving elements of the VR environment 30 and/or data that deterministically defines the movements and behavior of dynamic elements within the VR environment 30.

As the VR participant acts within the VR environment 30, the HMDD 32 relatively continuously streams, to the network computing device 12, pose data 34 that identifies changes in position and orientation of the VR participant within the VR environment 30. The pose data may include, for example, roll, yaw, and pitch data generated by an inertial measurement unit sensor (IMU) of the HMDD 32. The VR participant computing device 24 also continuously updates its local rendering of the VR environment 30, based on the downloadable VR content 28 and the actions taken by the VR participant as indicated by the pose data 34, to reflect a current state of the VR environment 30. The HMDD 32 receives imagery for the VR environment 30 from the VR participant computing device 24, and presents the imagery on a display device of the HMDD 32 for viewing by the VR participant. This process happens periodically, such as 30 or 60 times a second. In this manner, the VR participant can be presented with imagery of the VR environment 30 consistent with the position and movements of the VR participant, resulting in an enjoyable immersive experience for the VR participant.

The computer system 10 of FIG. 1 is further configured to enable a spectator using the client computing device 18 to view the VR environment 30 from one of a plurality of viewpoints (not shown) within the VR environment 30 (viewpoints provided within the VR environment 30 are discussed below in greater detail with respect to FIG. 3). The plurality of viewpoints may correspond to one or more viewpoints of VR participants within the VR environment 30, and/or may correspond to one or more predefined non-participant viewpoints. For example, if the VR environment 30 comprises a VR football game, the plurality of viewpoints may include viewpoints of one or more players of the VR football game, and/or one or more predefined virtual camera viewpoints (e.g., an overhead viewpoint or a sideline viewpoint, as non-limiting examples).

After receiving the downloadable VR content 28 from the network computing device 12, the client computing device 18 sends a viewpoint selection indication 36, corresponding to a selected viewpoint among the plurality of viewpoints within the VR environment 30, to the network computing device 12. The network computing device 12 then transmits a pose data stream 38, comprising pose data corresponding to the selected viewpoint, to the client computing device 18. For example, if the selected viewpoint corresponds to the VR participant using the VR participant computing device 24, then the pose data stream 38 may comprise the pose data 34 corresponding to the viewpoint of the VR participant. Because the pose data 34 is relatively small and may comprise compressible data such as text data, the bandwidth required to stream the pose data stream 38 is relatively small compared to the bandwidth required for streaming imagery of the VR environment 30. Consequently, the lower bandwidth required by the pose data stream 38 may enable the network computing device 12 to support a much larger number of spectators (e.g., thousands or millions of spectators) than conventional solutions. The client computing device 18 according to some embodiments may then display the VR environment 30 on a display device 40 communicatively coupled to the client computing device 18. The display device may comprise, as non-limiting examples, an HMDD 42 and/or a monitor 44.

In some embodiments, the pose data stream 38 may also comprise other data or metadata necessary for the client computing device 18 to accurately render the contents of the VR environment 30. For example, the pose data stream 38 may include pose data of VR participants other than the pose data 34, so that representations of the other VR participants may also be rendered correctly within the VR environment 30.

Some embodiments may provide that the pose data stream 38 comprises a live pose data stream that corresponds to actions currently being taken by a VR participant within the VR environment 30 or other activity currently underway within the VR environment 30. According to some embodiments, the pose data stream 38 may comprise a historical (i.e., prerecorded) pose data stream corresponding to actions taken by a VR participant at a past time. For example, the network computing device 12 may include a storage device 46 which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. Upon receiving the pose data 34 from the VR participant computing device 24, the network computing device 12 may record the pose data 34 on the storage device 46 in association with time metadata. The client computing device 18 may then provide a time selection indication 48 to the network computing device 12 in addition to the viewpoint selection indication 36 to specify the desired time from which the VR environment 30 is to be played back. For instance, if the VR environment 30 comprises a prerecorded VR football game, the time selection indication 48 may be used to indicate a point during the VR football game at which the user of the client computing device 18 wishes to begin the VR environment 30. The network computing device 12 may then transmit the pose data stream 38 corresponding to the selected viewpoint and the time indicated by the time selection indication 48.

Figure 2:
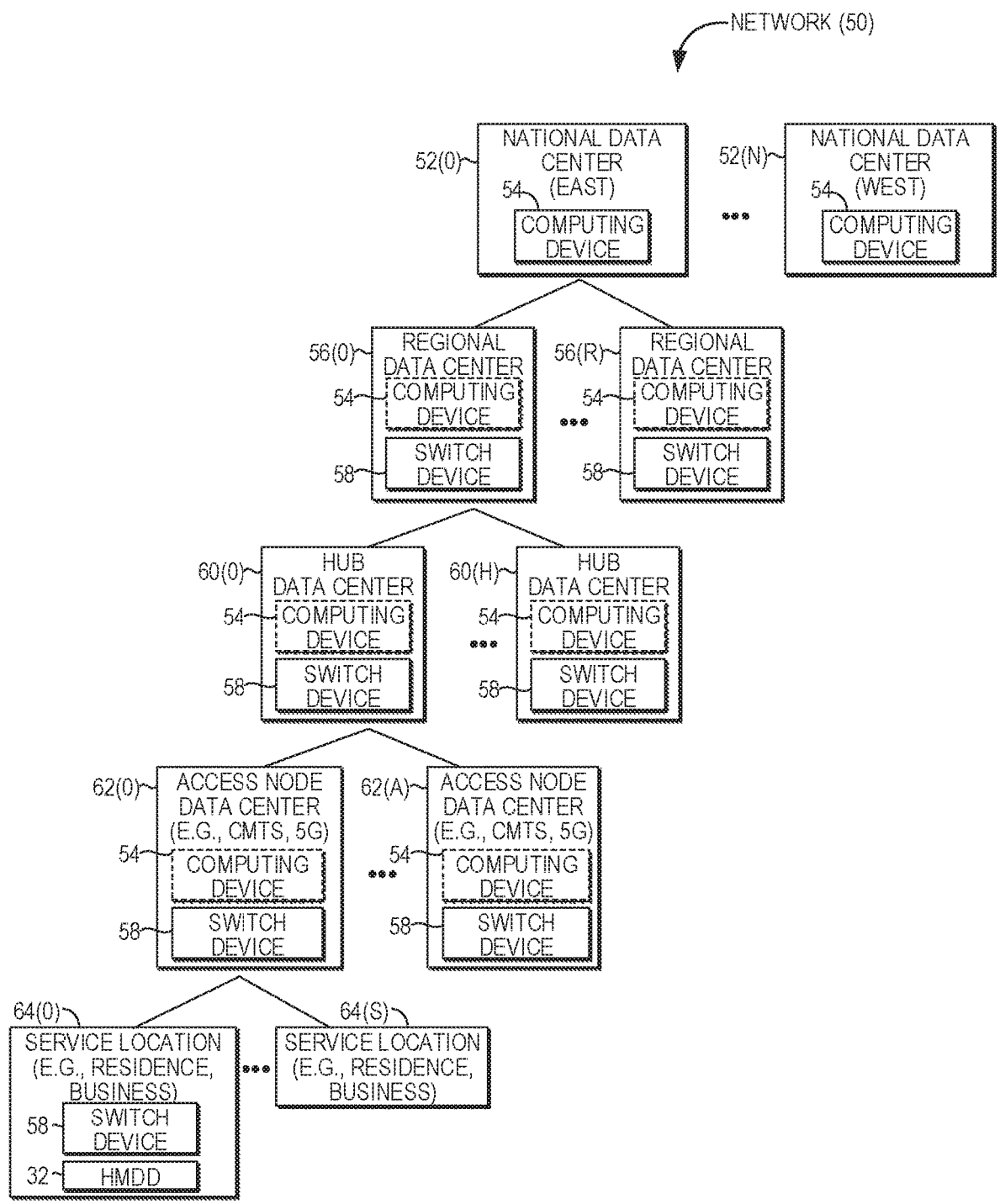
FIG. 2 is a block diagram illustrating a network that may be utilized in providing VR content, in accordance with some embodiments.

FIG. 2 illustrates a network 50 that may be employed for providing VR content according to some embodiments. As seen in FIG. 2, the network 50 represents a network of a national service provider that includes one or more national data centers 52(0)-52(N) (generally, national data centers 52). Each national data center 52 may serve, e.g., different regions of a country, and may include one or more image-rendering (IR) computing devices 54 that is suitable for rendering imagery of a virtual world as specified by VR content. In other words, the IR computing devices 54 may contain suitable central processing units (CPUs), graphics processing units (GPUs), and suitable electrical and cooling infrastructure for high-resolution image generation.

Each of the national data centers 52 is communicatively coupled to a plurality of regional data centers 56(0)-56(R) (illustrated only with respect to the national data center 52(0) due to space considerations). The regional data centers 56(0)-56(R) may also include one or more IR computing devices 54, and further include one or more switch devices 58 which process communications that traverse through the respective regional data centers 56(0)-56(R).

The regional data centers 56(0)-56(R) are each communicatively coupled to a plurality of hub data centers 60(0)-60(H) (illustrated only with respect to the regional data center 56(0) due to space considerations). The hub data centers 60(0)-60(H) may also have one or more IR computing devices 54 suitable for rendering imagery when providing VR streaming. The hub data centers 60(0)-60(H) also include one or more switch devices 58, which process communications that traverse through the respective hub data centers 60(0)-60(H).

Each of the hub data centers 60(0)-60(H) is communicatively coupled to a plurality of access node data centers 62(0)-62(A) (illustrated only with respect to the hub data center 60(0) due to space considerations). The access node data centers 62(0)-62(A) may also have one or more IR computing devices 54 suitable for rendering imagery. The access node data centers 62(0)-62(A) also include one or more switch devices 58, which process communications that traverse through the respective access node data centers 62(0)-62(A).

Finally, each of the access node data centers 62(0)-62(A) is communicatively coupled to one or more service locations 64(0)-64(S) (illustrated only with respect to the access node data center 62(0) due to space considerations). In the example of FIG. 2, the service location 64(0) includes an HMDD such as the HMDD 32 of FIG. 1, and may also include one or more switch devices 58, such as an optical-to-electrical converter and a local area network (LAN) router.

The network 50 is hierarchical, and each descending level has a greater number of data centers. Thus, there are a greater number of regional data centers 56 than national data centers 52, a greater number of hub data centers 60 than regional data centers 56, and a greater number of access node data centers 62 than hub data centers 60.

Figure 3:
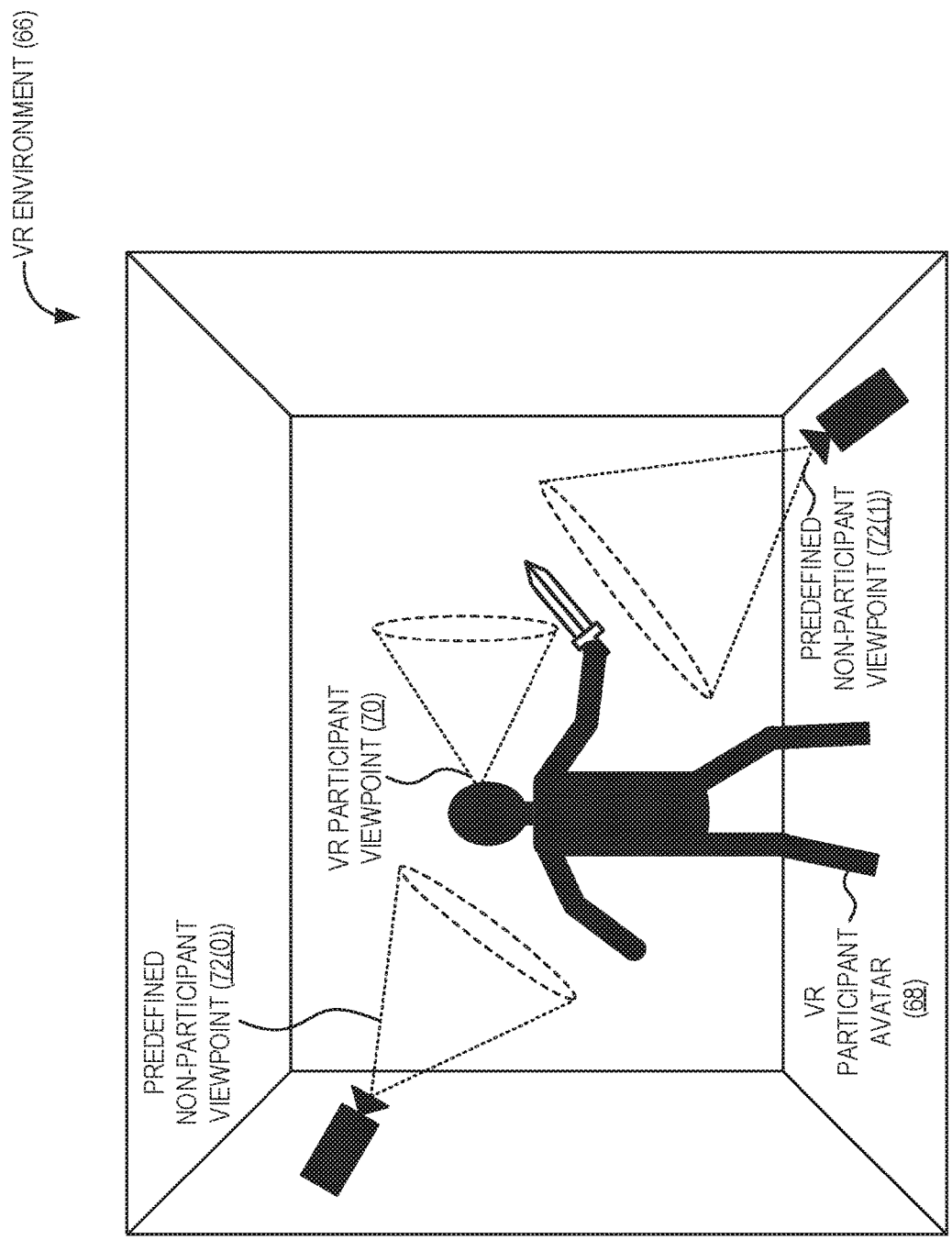
FIG. 3 is a diagram illustrating an exemplary VR environment including a plurality of selectable VR viewpoints, including a VR participant viewpoint and multiple predefined non-participant viewpoints, according to some embodiments.

FIG. 3 is a diagram illustrating an exemplary VR environment providing a plurality of selectable VR viewpoints. As seen in FIG. 3, a VR environment 66 provides a visual representation of the VR environment 30 of FIG. 1. The VR environment 66 of FIG. 3 is defined by downloadable VR content, such as the downloadable VR content 28 of FIG. 1, and is locally rendered as an immersive three-dimensional environment by computing devices such as the VR participant computing device 24 and the client computing device 18 of FIG. 1.

The VR environment 66 includes a VR participant avatar 68, which is an in-world representative of a VR participant in the VR environment 66 (such as, e.g., a user of the VR participant computing device 24 of FIG. 1). The VR participant avatar 68 is visible to other VR participants and spectators within the VR environment 66, and is rendered within the VR environment 66 according to pose data for the VR participant, such as the pose data 34 of FIG. 1. The VR participant herself may not see the VR participant avatar 68 in her local rendering of the VR environment 66, but rather may see a view of the VR environment from the perspective of a VR participant viewpoint 70. The VR environment 66 in the example of FIG. 3 also includes two predefined non-participant viewpoints 72(0) and 72(1). The position and orientation of the predefined non-participant viewpoints 72(0) and 72(1) may be specified by the downloadable VR content 28 of FIG. 1, and may provide alternate selectable viewpoints from which the VR environment 66 may be viewed by a spectator.

The VR participant viewpoint 70 and the predefined non-participant viewpoints 72(0), 72(1) of FIG. 3 are generally referred to herein collectively as a "plurality of viewpoints" and individually as "viewpoints." The VR participant viewpoint 70 and the predefined non-participant viewpoints 72(0), 72(1) are individually selectable by a spectator of the VR environment 66, such that the spectator may choose to view the VR environment 66 from the perspective of the VR participant viewpoint 70 or the predefined non-participant viewpoints 72(0) or 72(1) at any given time. The pose data stream 38 of FIG. 1 transmitted to the client computing device 18 in response to the spectator's viewpoint selection would then correspond to the selected viewpoint, allowing the client computing device 18 to render the VR environment 66 from the perspective of the selected viewpoint.

Figure 4:
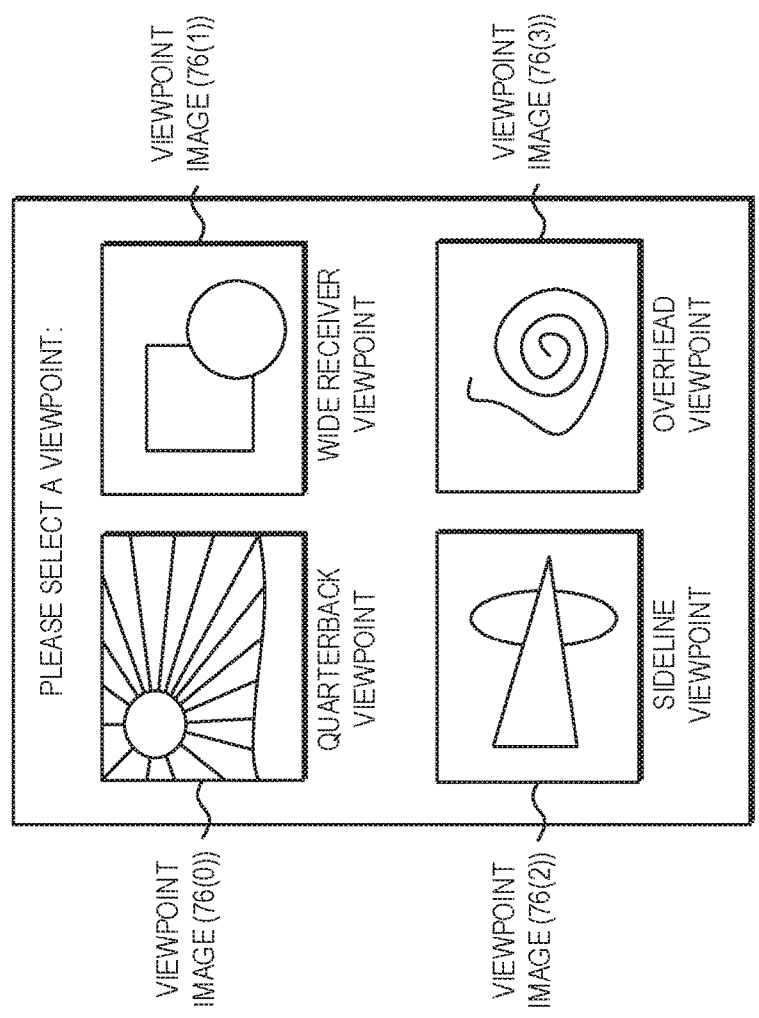
FIG. 4 is a diagram illustrating an exemplary client user interface (UI) for allowing spectators to select a VR viewpoint within a VR environment, in accordance with some embodiments.

FIG. 4 is a diagram illustrating an exemplary client user interface (UI) 74 that may be used by spectators to select a VR viewpoint within a VR environment, in accordance with some embodiments. To facilitate selection of a viewpoint, the network computing device 12 may provide a plurality of viewpoint images 76(0)-76(3) to the client computing device 18. Each of the plurality of viewpoint images 76(0)-76(3) may correspond to a different viewpoint within a VR environment (such as the viewpoints 70 and 72(0)-72(1) of the VR environment 66 of FIG. 3). The viewpoint images 76(0)-76(3) may comprise a static or dynamic thumbnail image from the perspective of the corresponding viewpoint, or may comprise an icon representative of the corresponding viewpoint, as non-limiting examples. The client computing device 18 may display the viewpoint images 76(0)-76(3) as part of a viewpoint selection UI presented to a spectator. The client computing device 18 may then receive a selection of one of the viewpoint images 76(0)-76(3) by the spectator, and may provide the selection of the viewpoint image 76(0)-76(3) as the viewpoint selection indication 36 of FIG. 1. It is to be understood that the client UI 74 may include more or fewer viewpoint images 76(0)-76(3) than shown in FIG. 4, and may present or arrange the viewpoint images 76(0)-76(3) differently than illustrated in FIG. 4.

Figure 5:
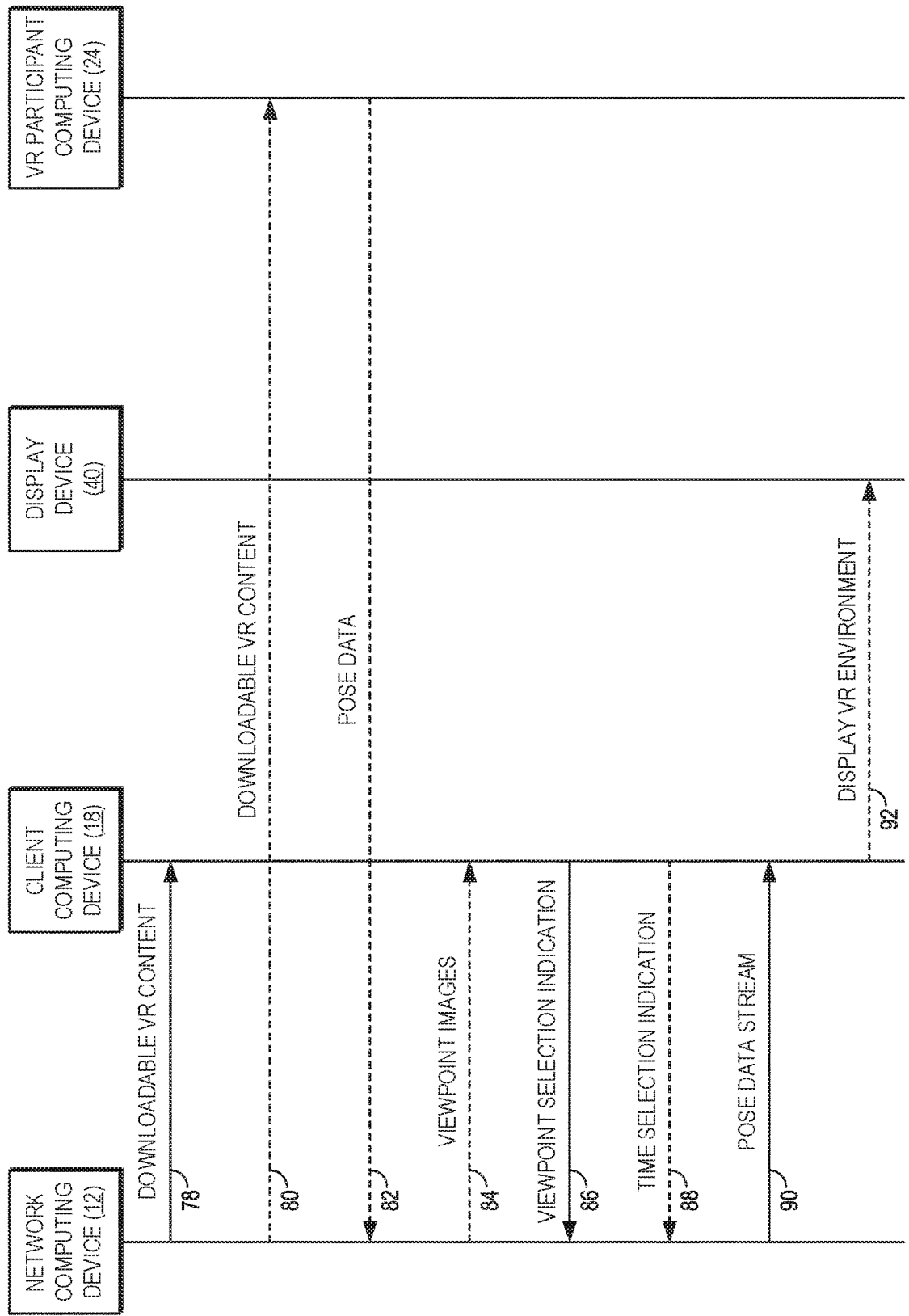
FIG. 5 is a message sequence diagram illustrating messages sent and operations performed when providing selectable VR viewpoints in a VR environment, in accordance with some embodiments.

FIG. 5 is a message sequence diagram illustrating messages sent and operations performed when providing selectable VR viewpoints in a VR environment, according to some embodiments. Elements of FIGS. 1, 3, and 4 are referenced in describing FIG. 5 for the sake of clarity. As seen in FIG. 5, the network computing device 12, the client computing device 18, the display device 40, and the VR participant computing device 24 of FIG. 1 are represented by vertical lines, with communications between these elements illustrated by captioned arrows.

In FIG. 5, operations begin with the network computing device 12 providing the downloadable VR content 28, defining the VR environment 30 comprising a plurality of viewpoints (such as the VR participant viewpoint 70 and the predefined non-participant viewpoints 72(0) and 72(1) of FIG. 3, as non-limiting examples) to the client computing device 18, as indicated by arrow 78. According to some embodiments, the network computing device 12 may also provide the downloadable VR content 28 to the VR participant computing device 24, as indicated by arrow 80. In such embodiments, the VR participant computing device 24 may subsequently provide the pose data 34 (representing, e.g., a position and an orientation of the VR participant within the VR environment 30) to the network computing device 12, as indicated by arrow 82. In some embodiments, the network computing device 12 may also provide the viewpoint images 76(0)-76(3) of FIG. 4 to the client computing device 18 for use in a client UI such as the client UI 74 of FIG. 4, as indicated by arrow 84.

The network computing device 12 next receives the viewpoint selection indication 36, corresponding to a selected viewpoint of the plurality of viewpoints 70, 72(0), and 72(1), from the client computing device 18, as indicated by arrow 86. The viewpoint selection indication 36 in some embodiments may indicate a selection of one of the viewpoint images 76(0)-76(3), as a non-limiting example. The network computing device 12 may also receive the time selection indication 48 from the client computing device 18 in embodiments in which the VR environment 30 is a historical (i.e., prerecorded) VR environment 30, as indicated by arrow 88.

The network computing device 12 transmits the pose data stream 38 corresponding to the selected viewpoint to the client computing device 18, as indicated by arrow 90. The pose data stream 38 may be a live pose data stream corresponding to ongoing activity within the VR environment 30, or may comprise a historical pose data stream corresponding to actions taken by a VR participant within the VR environment 30 at a past time. In the latter case, the pose data stream 38 transmitted by the network computing device 12 corresponds to the selected viewpoint and the time indicated by the time selection indication 48. The client computing device 18 then displays the VR environment 30 on the display device 40 from the perspective of the selected viewpoint based on the downloadable VR content 28 and the pose data 34 corresponding to the selected viewpoint, as indicated by arrow 92.

Figure 6A:
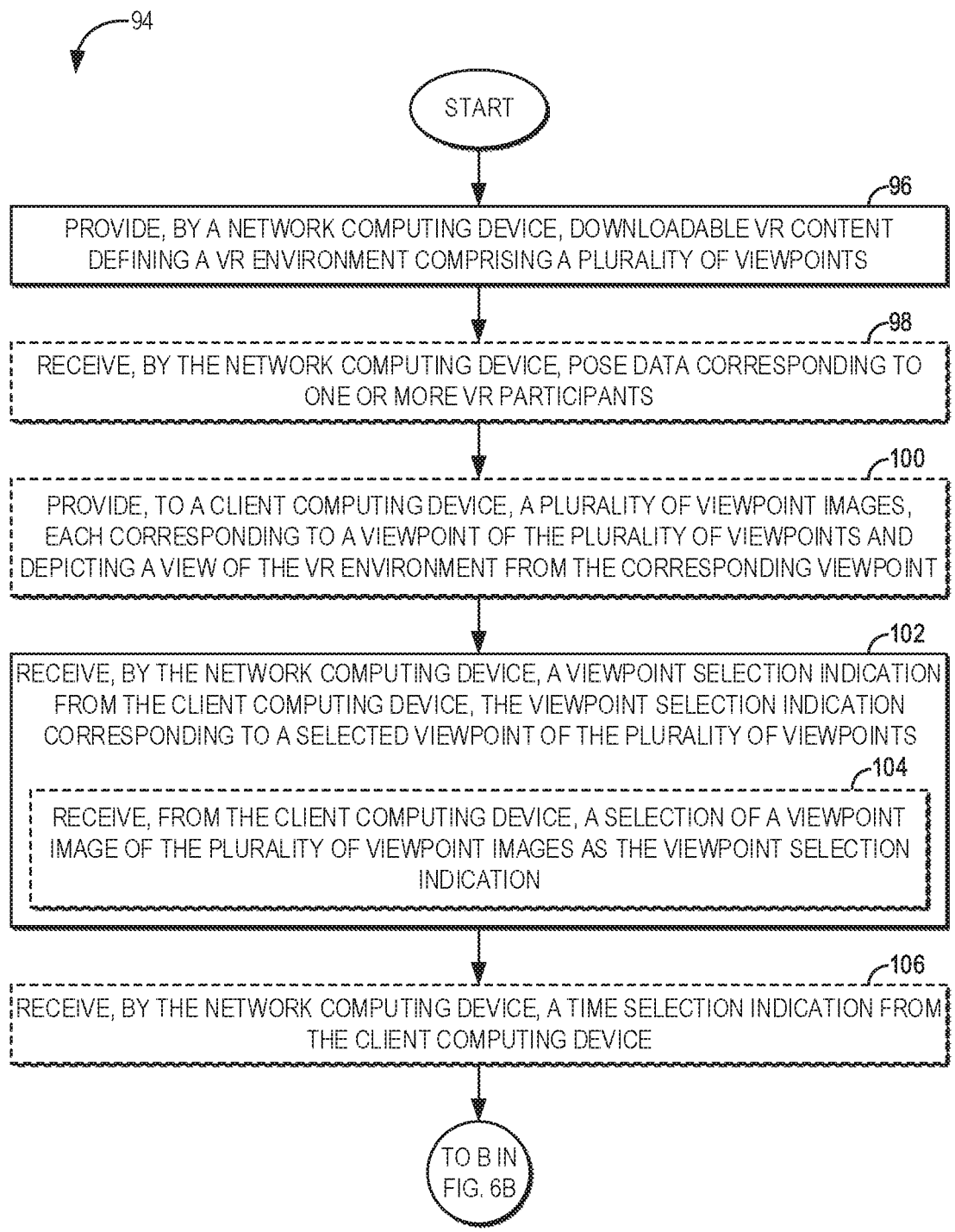
FIGS. 6A and 6B are flowcharts illustrating exemplary operations of the computer system of FIG. 1 for providing selectable VR viewpoints in a VR environment, in accordance with some embodiments.
Figure 6B:
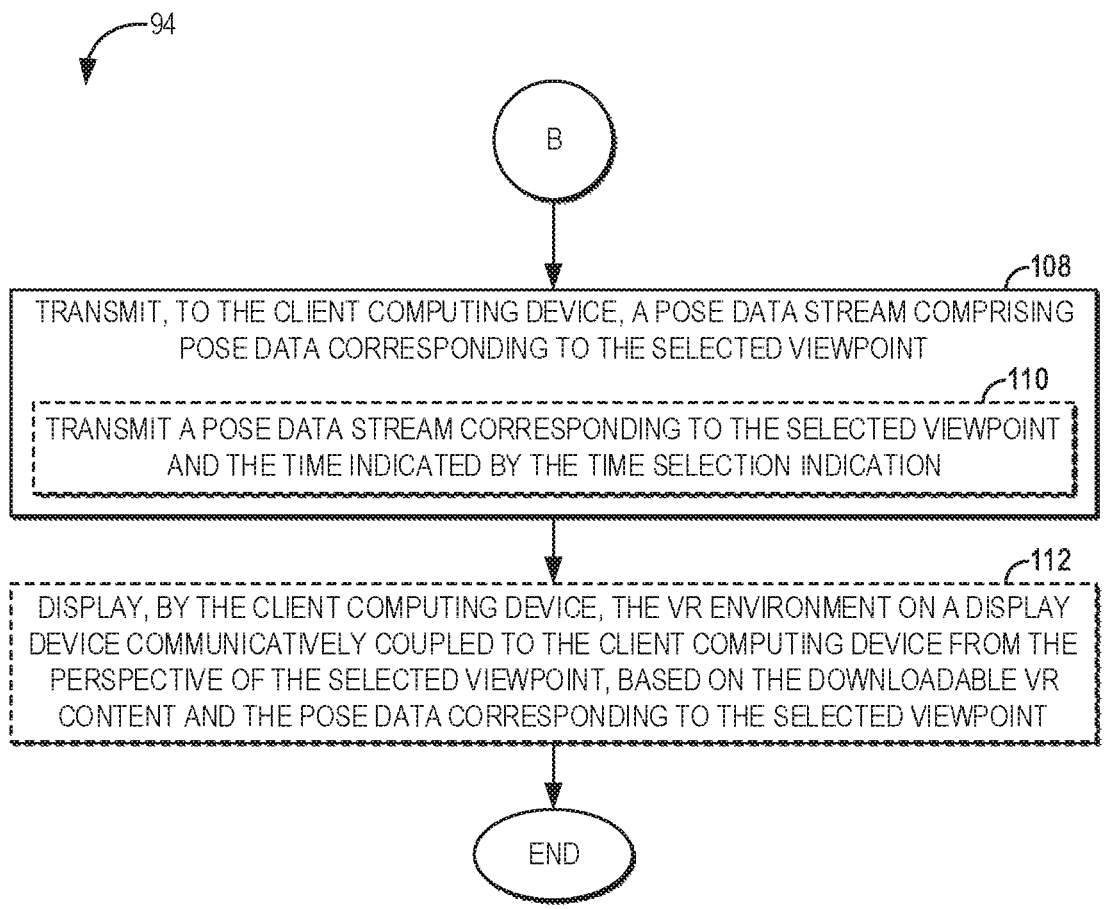

To illustrate exemplary operations of the computer system 10 of FIG. 1 for providing selectable VR viewpoints in a VR environment in accordance with some embodiments, FIGS. 6A and 6B provide a flowchart 94. For the sake of clarity, elements of FIGS. 1,3, and 4 are referenced in describing FIGS. 6A and 6B. Operations in FIG. 6A begin with the network computing device 12 providing the downloadable VR content 28 defining the VR environment 30 comprising the plurality of viewpoints, such as the viewpoints 70, 72(0), and 72(1) (block 96). In some embodiments, the network computing device 12 receives pose data, such as the pose data 34, corresponding to the one or more VR participants (block 98). Some embodiments may provide that the client computing device 18 provides the plurality of viewpoint images 76(0)-76(3), each corresponding to a viewpoint of the plurality of viewpoints 70, 72(0), and 72(1) and depicting a view of the VR environment 30 from the corresponding viewpoint (block 100).

The network computing device 12 then receives the viewpoint selection indication 36 from the client computing device 18, the viewpoint selection indication 36 corresponding to a selected viewpoint of the plurality of viewpoints 70, 72(0), and 72(1) (block 102). In some embodiments, the operations of block 104 for receiving the viewpoint selection indication 36 may comprise the network computing device 12 receiving, from the client computing device 18, a selection of a viewpoint image of the plurality of viewpoint images 76(0)-76(3) as the viewpoint selection indication 36 (block 104). Some embodiments may provide that the network computing device 12 also receives the time selection indication 48 from the client computing device (block 106). Operations then continue at block 108 in FIG. 6B.

Referring now to FIG. 6B, the network computing device 12 transmits the pose data stream 38, comprising pose data corresponding to the selected viewpoint (such as the pose data 34) to the client computing device 18 (block 108). In embodiments in which the pose data stream 38 comprises a historical pose data stream, the operations of block 108 for transmitting the pose data stream 38 may comprise transmitting the pose data stream 38 corresponding to the selected viewpoint and the time indicated by the time selection indication 48 (block 110). Some embodiments may further provide that the client computing device 18 displays the VR environment 30 on the display device 40 communicatively coupled to the client computing device 18 from the perspective of the selected viewpoint, based on the downloadable VR content 28 and the pose data corresponding to the selected viewpoint (block 112).

FIG. 7 is a block diagram of a computing device 114, such as the network computing device 12 and the client computing device 18 of FIG. 1, suitable for implementing examples according to one embodiment. The computing device 114 may comprise any computing or electronic device capable of including firmware, hardware, and/or executing software instructions to implement the functionality described herein, such as a computer server or the like. The computing device 114 includes a processor device 116, a memory 118, and a system bus 120. The system bus 120 provides an interface for system components including, but not limited to, the memory 118 and the processor device 116. The processor device 116 can be any commercially available or proprietary processor.

The system bus 120 may be any of several types of bus structures that may further interconnect to a memory bus (with or without a memory controller), a peripheral bus, and/or a local bus using any of a variety of commercially available bus architectures. The memory 118 may include non-volatile memory 122 (e.g., read-only memory (ROM), erasable programmable read-only memory (EPROM), electrically erasable programmable read-only memory (EEPROM), etc.), and volatile memory 124 (e.g., random-access memory (RAM)). A basic input/output system (BIOS) 126 may be stored in the non-volatile memory 122 and can include the basic routines that help to transfer information between elements within the computing device 114. The volatile memory 124 may also include a high-speed RAM, such as static RAM, for caching data.

The computing device 114 may further include or be coupled to a non-transitory computer-readable storage medium such as a storage device 128, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 128 and other drives associated with computer-readable media and computer-usable media may provide non-volatile storage of data, data structures, computer-executable instructions, and the like, such as the VR content.

A number of modules can be stored in the storage device 128 and in the volatile memory 124, including an operating system 130 and one or more program modules 132 (e.g., such as the VR server 26 of FIG. 1), which may implement the functionality described herein in whole or in part. All or a portion of the examples disclosed herein may be implemented as a computer program product 134 stored on a transitory or non-transitory computer-usable or computer-readable storage medium, such as the storage device 128, which includes complex programming instructions, such as complex computer-readable program code, to cause the processor device 116 to carry out the steps described herein. Thus, the computer-readable program code can comprise software instructions for implementing the functionality of the examples described herein when executed by the processor device 116. The processor device 116 may serve as a controller, or control system, for the computing device 114 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 116 through an input device interface 136 coupled to the system bus 120 but can be connected through other interfaces such as a parallel port, an Institute of Electrical and Electronic Engineers (IEEE) 1394 serial port, a Universal Serial Bus (USB) port, an IR interface, and the like.

The computing device 114 may also include a communications interface 138 suitable for communicating with the network 50 of FIG. 2 as appropriate or desired. The computing device 114 includes one or more GPUs 140.

Figure 8:
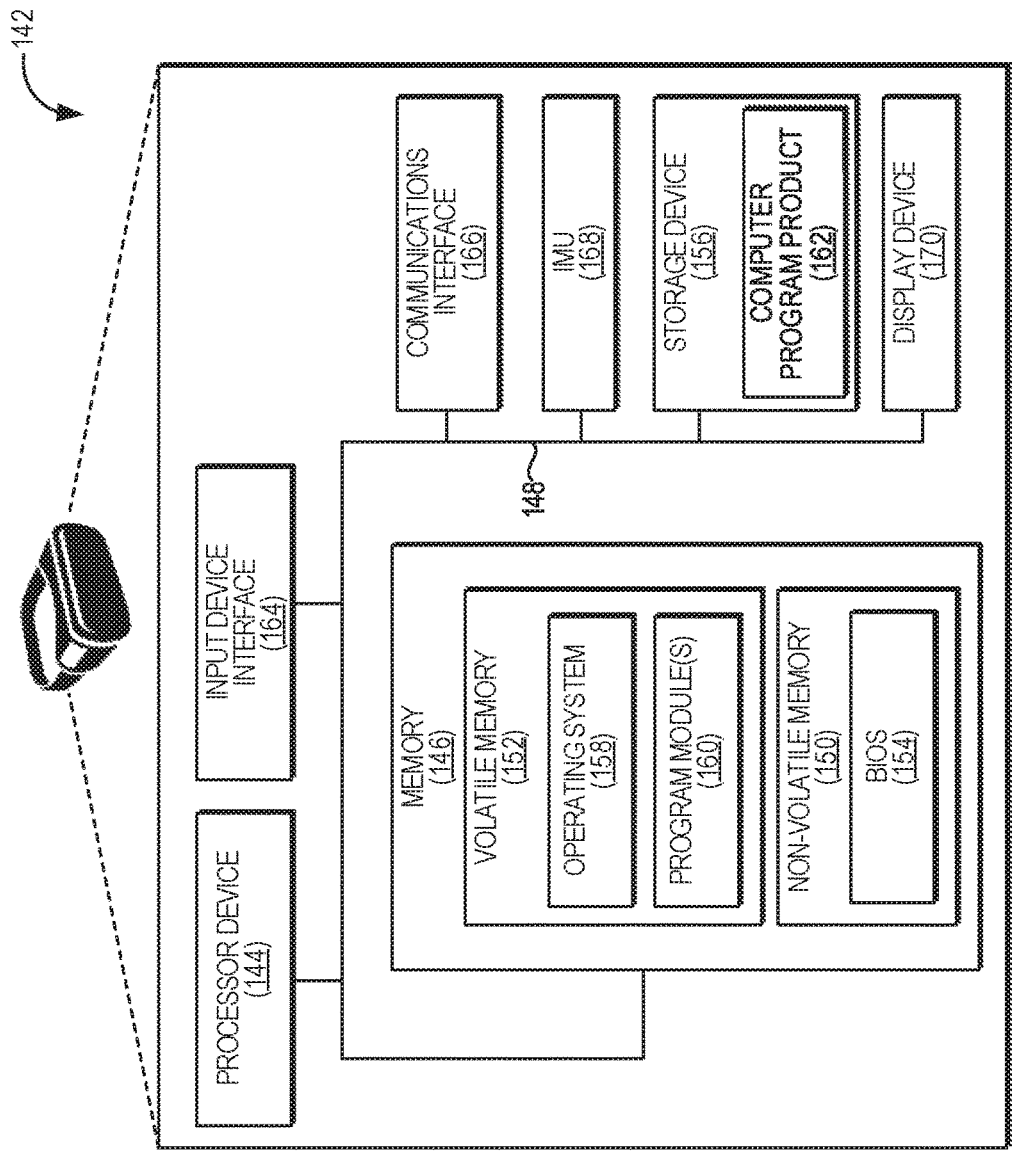
FIG. 8 is a block diagram of a VR head-mounted display device (HMDD) suitable for implementing embodiments disclosed herein.

FIG. 8 is a block diagram of an HMDD 142, such as the HMDD 32 of FIG. 1, according to one embodiment. The HMDD 142 includes a processor device 144, a memory 146, and a system bus 148. The system bus 148 provides an interface for system components including, but not limited to, the memory 146 and the processor device 144. The processor device 144 can be any commercially available or proprietary processor.

The system bus 148 may be any of several types of bus structures that may further interconnect to a memory bus (with or without a memory controller), a peripheral bus, and/or a local bus using any of a variety of commercially available bus architectures. The memory 146 may include non-volatile memory 150 (e.g., read-only memory (ROM), erasable programmable read-only memory (EPROM), electrically erasable programmable read-only memory (EEPROM), etc.), and volatile memory 152 (e.g., random-access memory (RAM)). A basic input/output system (BIOS) 154 may be stored in the non-volatile memory 150 and can include the basic routines that help to transfer information between elements within the HMDD 142. The volatile memory 152 may also include a high-speed RAM, such as static RAM, for caching data.

The HMDD 142 may further include a non-transitory computer-readable storage medium such as a storage device 156, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 156 and other drives associated with computer-readable media and computer-usable media may provide non-volatile storage of data, data structures, computer-executable instructions, and the like.

A number of modules can be stored in the storage device 156 and in the volatile memory 152, including an operating system 158 and one or more program modules 160, which may implement the functionality described herein in whole or in part. All or a portion of the examples disclosed herein may be implemented as a computer program product 162 stored on a transitory or non-transitory computer-usable or computer-readable storage medium, such as the storage device 156, which includes complex programming instructions, such as complex computer-readable program code, to cause the processor device 144 to carry out the steps described herein. Thus, the computer-readable program code can comprise software instructions for implementing the functionality of the examples described herein when executed by the processor device 144.

An operator may also be able to enter one or more configuration commands through buttons or other input controls integrated into the HMDD 142, or via an external interface such as a keyboard (not illustrated), a pointing device such as a mouse (not illustrated), or a wireless VR controller (not illustrated). Such input devices may be connected to the processor device 144 through an input device interface 164 coupled to the system bus 148 but can be connected by other interfaces such as a parallel port, an Institute of Electrical and Electronic Engineers (IEEE) 1394 serial port, a Universal Serial Bus (USB) port, an IR interface, and the like. In some embodiments, the operator may provide input through hand motions that are tracked by cameras (not illustrated) provided by the HMDD 142 or present in physical proximity to the operator.

The HMDD 142 may also include a communications interface 166 suitable for communicating with a network, such as the network 50 of FIG. 2, as appropriate or desired. The HMDD 142 includes an IMU 168 and a display device 170. In some embodiments the HMDD 142 does not include a GPU.

Those skilled in the art will recognize improvements and modifications to the preferred embodiments of the disclosure. All such improvements and modifications are considered within the scope of the concepts disclosed herein and the claims that follow.

What is claimed is:

1. A method for providing selectable virtual reality (VR) viewpoints within a VR environment, comprising:

transmitting, by a network computing device, downloadable VR content defining a VR environment comprising a plurality of viewpoints to a client computing device and to a plurality of VR participant computing devices associated with a plurality of VR participants; and subsequent to transmitting the downloadable VR content:

receiving, by the network computing device, a viewpoint selection indication from the client computing device, the viewpoint selection indication corresponding to a selected viewpoint of the plurality of viewpoints; and transmitting, by the network computing device to the client computing device, a pose data stream corresponding to a pose of a VR participant computing device of the plurality of VR participant computing devices, the pose data stream comprising pose data from the VR participant computing device corresponding to the selected viewpoint;

wherein:

the downloadable VR content does not include pose data, and the downloadable VR content is transmitted by the network computing device prior to the pose data stream being transmitted to the client computing device;

the plurality of viewpoints comprises a plurality of VR participant viewpoints corresponding to the plurality of VR participants within the VR environment;

the selected viewpoint comprises a VR participant viewpoint among the plurality of VR participant viewpoints corresponding to a VR participant within the VR environment; and the pose data stream comprises a live pose data stream corresponding to the VR participant.

2. The method of claim 1, wherein:
the pose data stream further comprises a historical pose data stream corresponding to the selected viewpoint;
the method further comprises receiving, by the network computing device, a time selection indication from the client computing device; and
transmitting the pose data stream comprises transmitting a position data stream corresponding to the selected viewpoint and a time indicated by the time selection indication.

3. The method of claim 1, wherein the plurality of viewpoints further comprises one or more predefined non-participant viewpoints within the VR environment.

4. The method of claim 1, wherein the pose data comprises data representing one or more of a position and an orientation of the selected viewpoint within the VR environment at a specified instant in time.

5. The method of claim 1, further comprising displaying, by the client computing device, the VR environment on a display device communicatively coupled to the client computing device from the perspective of the selected viewpoint, based on the VR content and the pose data corresponding to the selected viewpoint.

6. The method of claim 5, wherein the display device comprises one of a VR head-mounted display device (HMDD) and a monitor.

7. The method of claim 1, further comprising:
providing, to the client computing device, a plurality of viewpoint images, each corresponding to a viewpoint of the plurality of viewpoints and depicting a view of the VR environment from the corresponding viewpoint; and
receiving, from the client computing device, a selection of a viewpoint image of the plurality of viewpoint images as the viewpoint selection indication.

8. The method of claim 1, wherein the client computing device is a VR participant computing device of the plurality of VR participant computing devices.

9. A computer system for providing selectable virtual reality (VR) viewpoints within a VR environment, comprising:
a network computing device comprising:
a first memory; and
a first processor device coupled to the first memory and configured to:
transmit downloadable VR content defining a VR environment comprising
a plurality of viewpoints to a client computing device and to a plurality of VR participant computing devices associated with a plurality of VR participants; and
subsequent to transmitting the downloadable VR content:
receive a viewpoint selection indication from the client computing device, the viewpoint selection indication corresponding to a selected viewpoint of the plurality of viewpoints; and
transmit, by the network computing device to the client computing device, a pose data stream corresponding to a pose of a VR participant computing device of the plurality of VR participant computing devices, the pose data stream comprising pose data from the VR participant computing device corresponding to the selected viewpoint;

wherein:
the downloadable VR content does not include pose data, and the downloadable VR content is transmitted by the network computing device prior to the pose data stream being transmitted to the client computing device;
the plurality of viewpoints comprises a plurality of VR participant viewpoints corresponding to the plurality of VR participants within the VR environment;
the selected viewpoint comprises a VR participant viewpoint among the plurality of VR participant viewpoints corresponding to a VR participant within the VR environment; and
the pose data stream comprises a live pose data stream corresponding to the VR participant.

10. The computer system of claim 9, wherein:
the pose data stream further comprises a historical pose data stream corresponding to the selected viewpoint;
the first processor device is further configured to receive a time selection indication from the client computing device; and
the first processor device is configured to transmit the pose data stream by being configured to transmit a position data stream corresponding to the selected viewpoint and a time indicated by the time selection indication.

11. The computer system of claim 9, wherein the plurality of viewpoints further comprises one or more predefined non-participant viewpoints within the VR environment.

12. The computer system of claim 9, wherein the pose data corresponding to the selected viewpoint comprises data representing one or more of a position and an orientation of the selected viewpoint within the VR environment at a specified instant in time.

13. The computer system of claim 9, further comprising:
the client computing device comprising:
a second memory; and
a second processor device coupled to the second memory and configured to display the VR environment on a display device communicatively coupled to the client computing device from the perspective of the selected viewpoint, based on the VR content and the pose data corresponding to the selected viewpoint.

14. The computer system of claim 13, wherein the display device comprises one of a VR head-mounted display device (HMDD) and a monitor.

15. The computer system of claim 9, wherein the first processor device is further configured to:
provide, to the client computing device, a plurality of viewpoint images, each corresponding to a viewpoint of the plurality of viewpoints and depicting a view of the VR environment from the corresponding viewpoint; and
receive, from the client computing device, a selection of a viewpoint image of the plurality of viewpoint images as the viewpoint selection indication.

16. The computer system of claim 9, wherein the client computing device is a VR participant computing device of the plurality of VR participant computing devices.

17. A computer program product stored on a non-transitory computer-readable storage medium and including computer-executable instructions configured to cause a processor device to:
transmit downloadable VR content defining a VR environment comprising a plurality of viewpoints to a client computing device and to a plurality of VR participant computing devices associated with a plurality of VR participants; and subsequent to transmitting the downloadable VR content:
  receive a viewpoint selection indication from a client computing device, the viewpoint selection indication corresponding to a selected viewpoint of the plurality of viewpoints; and
  transmit, to the client computing device, a pose data stream corresponding to a pose of a VR participant computing device of the plurality of VR participant computing devices, the pose data stream comprising pose data from the VR participant computing device corresponding to the selected viewpoint;
  wherein:
    the downloadable VR content does not include pose data, and the downloadable VR content is transmitted by the network computing device prior to the pose data stream being transmitted to the client computing device;
    the plurality of viewpoints comprises a plurality of VR participant viewpoints corresponding to the plurality of VR participants within the VR environment;
    the selected viewpoint comprises a VR participant viewpoint among the plurality of VR participant viewpoints corresponding to a VR participant within the VR environment; and
    the pose data stream comprises a live pose data stream corresponding to the VR participant.

18. The computer program product of claim 17, wherein the plurality of viewpoints further comprises one or more predefined non-participant viewpoints within the VR environment.

19. The computer program product of claim 17, wherein the client computing device is a VR participant computing device of the plurality of VR participant computing devices.

* * * * *